(12) United States Patent
Dudar

(10) Patent No.: US 12,337,852 B2
(45) Date of Patent: Jun. 24, 2025

(54) VEHICLE LOAD BALANCING SYSTEMS AND METHODS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 18/333,083

(22) Filed: Jun. 12, 2023

(65) Prior Publication Data
US 2024/0409103 A1 Dec. 12, 2024

(51) Int. Cl.
*B60W 40/13* (2012.01)
*B60W 40/10* (2012.01)

(52) U.S. Cl.
CPC ............ *B60W 40/13* (2013.01); *B60W 40/10* (2013.01); *B60W 2040/1323* (2013.01)

(58) Field of Classification Search
CPC .. B60W 60/0015; B60W 40/02; B60W 40/12; B60W 2420/403; B60W 2556/10; B60W 2556/45
USPC .......................................................... 701/23
See application file for complete search history.

(56) References Cited

U.S. PATENT DOCUMENTS

| | | | | |
|---|---|---|---|---|
| 6,157,889 A * | 12/2000 | Baker | ..................... | G06Q 10/08 701/124 |
| 8,150,613 B2 * | 4/2012 | Engelhard | ............. | B60W 40/13 180/290 |
| 10,266,201 B2 * | 4/2019 | Dang | ..................... | B62D 6/002 |
| 2012/0150395 A1 * | 6/2012 | Fortmann | ............... | B60P 1/045 414/800 |
| 2021/0197820 A1 * | 7/2021 | Keller | ..................... | B62D 15/00 |
| 2021/0383318 A1 * | 12/2021 | Patnaik | .............. | G06Q 10/0832 |
| 2022/0327824 A1 * | 10/2022 | Rogness | ............. | B60R 16/0232 |
| 2023/0245473 A1 * | 8/2023 | Kwon | ................... | G06T 7/0002 382/103 |
| 2024/0034303 A1 * | 2/2024 | Y P | ........................ | G01G 19/12 |
| 2024/0124007 A1 * | 4/2024 | Hawley | ..................... | G06T 7/70 |
| 2024/0399946 A1 * | 12/2024 | Salter | ..................... | B60Q 1/307 |

OTHER PUBLICATIONS

Monica Gonderman, Rivian Wants to Eliminate Annoying K-Turns, Motortrend, Jul. 9, 2021, 1-11.

* cited by examiner

*Primary Examiner* — Krishnan Ramesh
(74) *Attorney, Agent, or Firm* — Emily Drake; Eversheds Sutherland (US) LLP

(57) ABSTRACT

The disclosure is generally directed to vehicle load balancing systems and methods. An example method executed by a processor includes receiving, from a weight sensor, a first weight measurement of a cargo item placed upon a cargo bed of a vehicle and further includes receiving a second weight measurement from the weight sensor after detecting that the vehicle is in motion. The processor then determines, based on detecting a difference between the first weight measurement and the second weight measurement that the cargo item has shifted from a first spot to a second spot on the cargo bed. The example method can further involve placing the cargo bed in a tilted configuration followed by configuring the vehicle to jerk sporadically while traveling in a first direction that is selected to shift the cargo item back from the second spot to the first spot on the cargo bed.

16 Claims, 7 Drawing Sheets

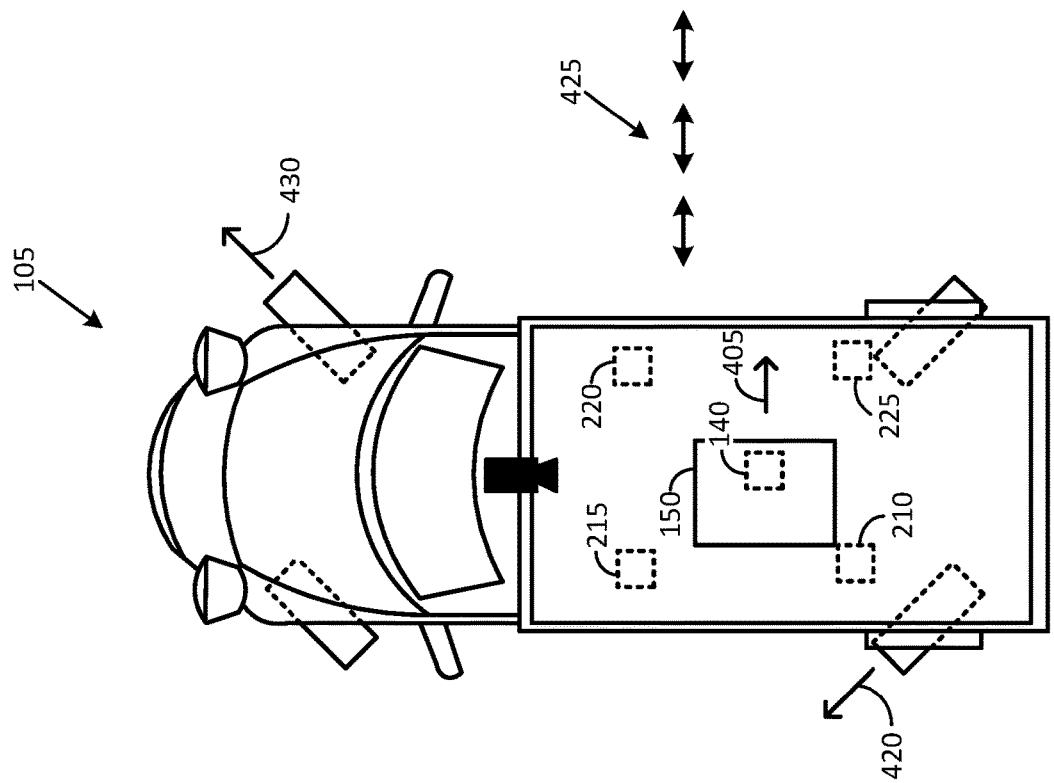
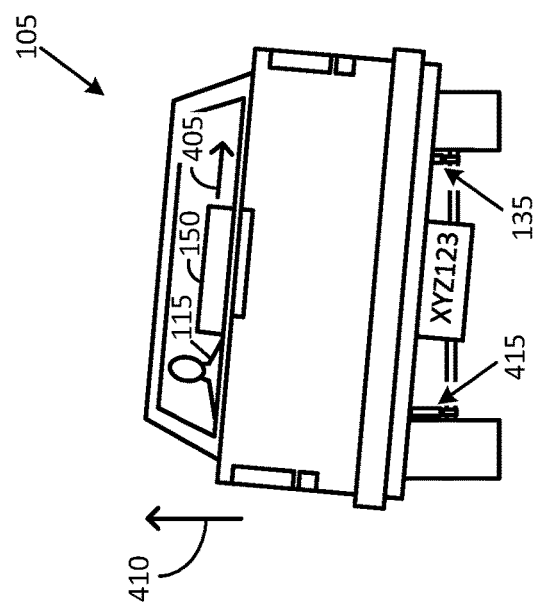
FIG. 4B
FIG. 4A

VEHICLE LOAD BALANCING SYSTEMS AND METHODS

BACKGROUND

A cargo item loaded on a vehicle may shift when the vehicle is moving. The shift may be caused as a result of various factors such as, for example, a rough road surface and vehicle vibration. Such shifting is generally undesirable and may need addressing. While it is currently unsafe and not permitted by regulation to transport unrestrained or improperly restrained loads in truck cargo beds, it is anticipated that technology and the regulatory framework may evolve in the future to where this does becomes safe and permissible.

BRIEF DESCRIPTION OF THE DRAWINGS

A detailed description is set forth below with reference to the
accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 4A and 4B illustrate a second example scenario associated with a load balancing procedure that can be carried out in accordance with an embodiment of the disclosure.

DETAILED DESCRIPTION

Overview

Figure 1:
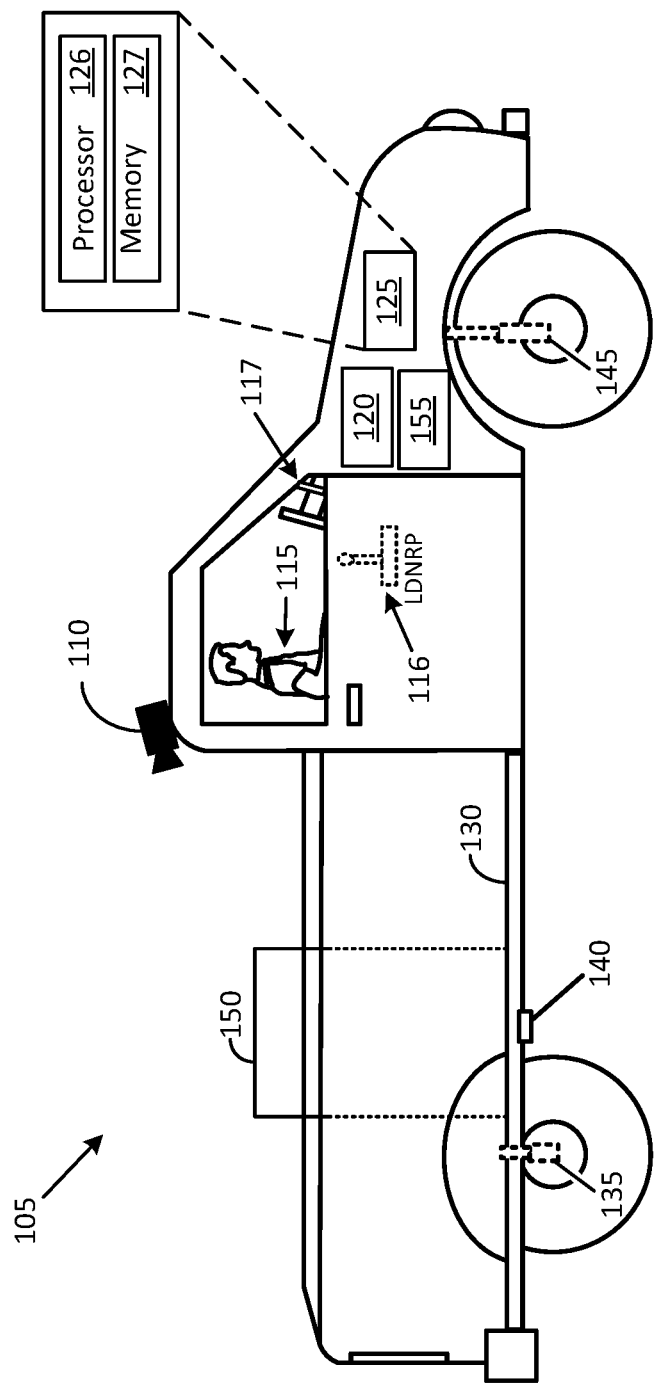
FIG. 1 shows an example vehicle that includes a vehicle load balancing system in accordance with an embodiment of the disclosure.

In terms of a general overview, embodiments described in this disclosure are generally directed to vehicle load balancing systems and methods. An example method executed by a processor of a vehicle load balancing system in a vehicle includes receiving, from a first weight sensor, a first weight measurement of a cargo item placed at a first spot upon a cargo bed of a vehicle. A second weight measurement is received from the first weight sensor after detecting that the vehicle is in motion. The processor determines, based on detecting a difference between the first weight measurement and the second weight measurement that the cargo item has shifted from the first spot to a second spot on the cargo bed due to the motion of the vehicle. The example method can further involve placing the cargo bed of the vehicle in a tilted configuration that is determined at least in part on the direction of shift of the cargo item on the cargo bed. The vehicle is then subjected to a jerky sporadic mode of travel while moving in a first direction that is selected to shift the cargo item back from the second spot to the first spot on the cargo bed.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "information" as used herein pertains to any of various forms of data that can be processed by a processor (digital data, digital images, detector signals, etc.). The word "image" as used herein encompasses one or more images in one or more forms. Thus, for example, a description herein of an action associated with an "image" must be understood to indicate an action performed upon a single image in some scenarios and upon multiple images in some other scenarios. The multiple images can be included in various forms such as, for example, in the form of a video clip, and/or in the form of real-time video.

The words "sensor" and "detector" that are used herein in an alternative manner refer to any device than may be used to obtain information about an object, to detect the presence of an object, or to detect a movement of an object. The word "object" and the word "item" are used in this disclosure in an interchangeable manner. The word "vehicle" as used in this disclosure can pertain to any one of various types of vehicles such as cars, vans, sports utility vehicles, trucks, electric vehicles, gasoline vehicles, and hybrid vehicles. The phrase "cargo bed" as used herein encompass any portion of a vehicle on which an item can be placed and transported by the vehicle such as, for example, a bed of a truck, a bed of an enclosed van, a bed of a semi-trailer, and a trunk of a sedan. Words such as "position" and "spot" may be used herein in an alternative manner.

It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

FIG. 1 shows a vehicle 105 that includes a vehicle load balancing system 125 in accordance with an embodiment of the disclosure. The vehicle 105 may further include components such as, for example, a vehicle computer 120, a camera 110, an infotainment system 117, a zero-radius turn system 155, and a weight sensor 140. These components may be communicatively coupled to the vehicle load balancing system 125 via a wired communication system and/or a wireless communication system.

In the illustrated example, the vehicle 105 is a truck containing a cargo bed on which items can be placed and the description herein pertains to various systems and methods of operation associated with the truck. However, it must be understood that the systems and methods of operation described herein are equally applicable to various other types of vehicles (a van, a sports utility vehicle, a semi-trailer truck, a sedan, etc.) having a flat surface upon which a cargo item can be placed and transported. Thus, for example, a description pertaining to an exposed cargo bed of a truck is equally relevant to an enclosed cargo bed of a delivery van, a sedan, or a sports utility vehicle, for example. Furthermore, the vehicle 105 in the illustrated example implementation is a driver-operated vehicle. In other example implementations, the vehicle 105 can be an autonomous vehicle and a controller provided in the autonomous vehicle can perform the various operations that are described herein as being carried out by a driver 115 of the vehicle 105 in accordance with the disclosure.

The vehicle computer 120 may perform various functions of the vehicle 105, such as, for example, controlling engine operations (fuel injection, speed control, emissions control, braking, etc.), managing climate controls (air conditioning, heating etc.), activating airbags, and issuing messages (check engine light, bulb malfunction, low tire pressure, etc.). The vehicle computer 120 may also provide various types of information to the vehicle load balancing system 125, such as, for example, information pertaining to operations associated with the vehicle 105 (speed, movement status, parked status, etc.).

In the illustrated implementation, the weight sensor 140 and the camera 110 are two example devices that can be used to provide information to the vehicle load balancing system 125. In other implementations, additional weight sensors, cameras and/or other types of devices may be used to provide information to the vehicle load balancing system 125. The weight measurements provided by the weight sensor 140 and the images provided by the camera 110 may be evaluated by the vehicle load balancing system 125 for various purposes. In an example scenario, the vehicle load balancing system 125 may evaluate weight measurements provided by the weight sensor 140 to detect a cargo item 150 placed upon a cargo bed 130 of the vehicle 105 and to detect a positional shift of the cargo item 150 as a result of motion of the vehicle 105. The vehicle load balancing system 125 may evaluate one or more images provided by the camera 110 to detect a cargo item 150 placed upon a cargo bed 130 of the vehicle 105 and to determine a direction in which the cargo item 150 may have shifted as a result of motion of the vehicle 105. The cargo item 150 can be any object such as, for example, a package, a box, a sack, a bag, a container, a piece of luggage, a piece of furniture, an equipment, or a piece of machinery.

The weight sensor 140 can be a pressure transducer that produces an electrical signal having an amplitude that is directly proportional to an amount of pressure applied upon the weight sensor 140. The amount of pressure applied upon the weight sensor 140 in this case is due to weight of the cargo item 150. In one example implementation, the electrical signal produced by the weight sensor 140 is an analog signal that is conveyed to the vehicle load balancing system 125 and converted by the vehicle load balancing system 125 into a digital format that can be operated upon by the processor 126. In another example implementation, the weight sensor 140 produces a measurement having a digital format and the signal is conveyed to the vehicle load balancing system 125 in a digital format (bytes, for example) that can be operated upon by the processor 126.

The vehicle 105 can further include an active suspension system having multiple shock absorbers that are height adjustable by a driver 115 of the vehicle 105 and/or by the vehicle computer 120. In a first example implementation, the driver 115 can depress a button on a console in the cabin area of the vehicle 105 or activate a switch on the console in the cabin area of the vehicle 105 to manually engage and operate the active suspension system.

In an example scenario, the driver 115 can use an actuation component (a lever, a button etc., not shown) in the cabin of the vehicle 105 to raise a first shock absorber 145 on a front passenger-side of the vehicle 105 and a second shock absorber (not shown) on a front driver-side of the vehicle 105 to a desired height for lifting the front portion of the vehicle 105. In another example scenario, the driver 115 can use the actuation component (not shown) in the cabin of the vehicle 105 to raise a third shock absorber 135 on a rear passenger-side wheel of the vehicle 105 and a fourth shock absorber (not shown) on a rear driver-side wheel of the vehicle 105 to a desired height for lifting the rear portion of the vehicle 105.

In another example scenario, the driver 115 can use the control element (not shown) in the cabin of the vehicle 105 to raise the first shock absorber 145 the front passenger-side of the vehicle 105 and the third shock absorber 135 on the rear passenger-side wheel of the vehicle 105 for raising a passenger side of the vehicle 105. In this tilted configuration, the driver side of the vehicle 105 is closer to the ground than the passenger side.

Conversely, the driver 115 can use the control element (not shown) in the cabin of the vehicle 105 to raise the second shock absorber (not shown) on the front driver-side of the vehicle 105 and the fourth shock absorber on the rear driver-side wheel of the vehicle 105 for raising a driver side of the vehicle 105. In this tilted configuration, the passenger side of the vehicle 105 is closer to the ground than the driver side.

In another example implementation, where the vehicle 105 is an autonomous vehicle, the vehicle load balancing system 125 can automatically operate the active suspension system to selectively lift the rear portion of the vehicle 105, the front portion of the vehicle 105, a driver side of the vehicle 105, or a passenger side of the vehicle 105 to carry out various operations in accordance with the invention.

Such actions performed by the vehicle load balancing system 125 can replicate the actions described above with reference to the driver 115.

In another example implementation, the cargo bed 130 can be provided in the form of a tiltable platform mounted upon the cargo bed 130 or the chassis of the vehicle 105. The tiltable platform can be selectively placed by the driver 115 (or by the vehicle load balancing system 125) in various angular configurations (such as the example configurations described above). The tiltable platform may be supported by one or more of various components of a cargo bed tilting system, such as, for example, shock absorbers, springs, hydraulic jacks, or ratcheting bars that can be selectively raised or lowered by the driver 115 (or the vehicle load balancing system 125) in accordance with the disclosure.

The zero-radius turn system 155 is operable to enable turning of one or more wheels of the vehicle 105 in a first direction and one or more other wheels of the vehicle 105 in an opposite direction. For example, the zero-radius turn system 155 can be operated to turn a pair of front wheels of the vehicle 105 to the right and concurrently turn a pair of rear wheels of the vehicle 105 to the left so as to allow the driver 115 of the vehicle 105 to crab-walk sideways towards the right. Crab-walking, which may be alternatively referred to by various other words and phrases (such as, for example, crawling) allows the vehicle 105 to move sideways in a direction that is substantially perpendicular to an axial direction of movement of the vehicle 105 (sideways left or sideways right). An example system is described in U.S. Publication 2022/0097704 A1 titled "Crawl Operations for Four-Wheel Steering Vehicles" published Mar. 31, 2022.

Figure 2:
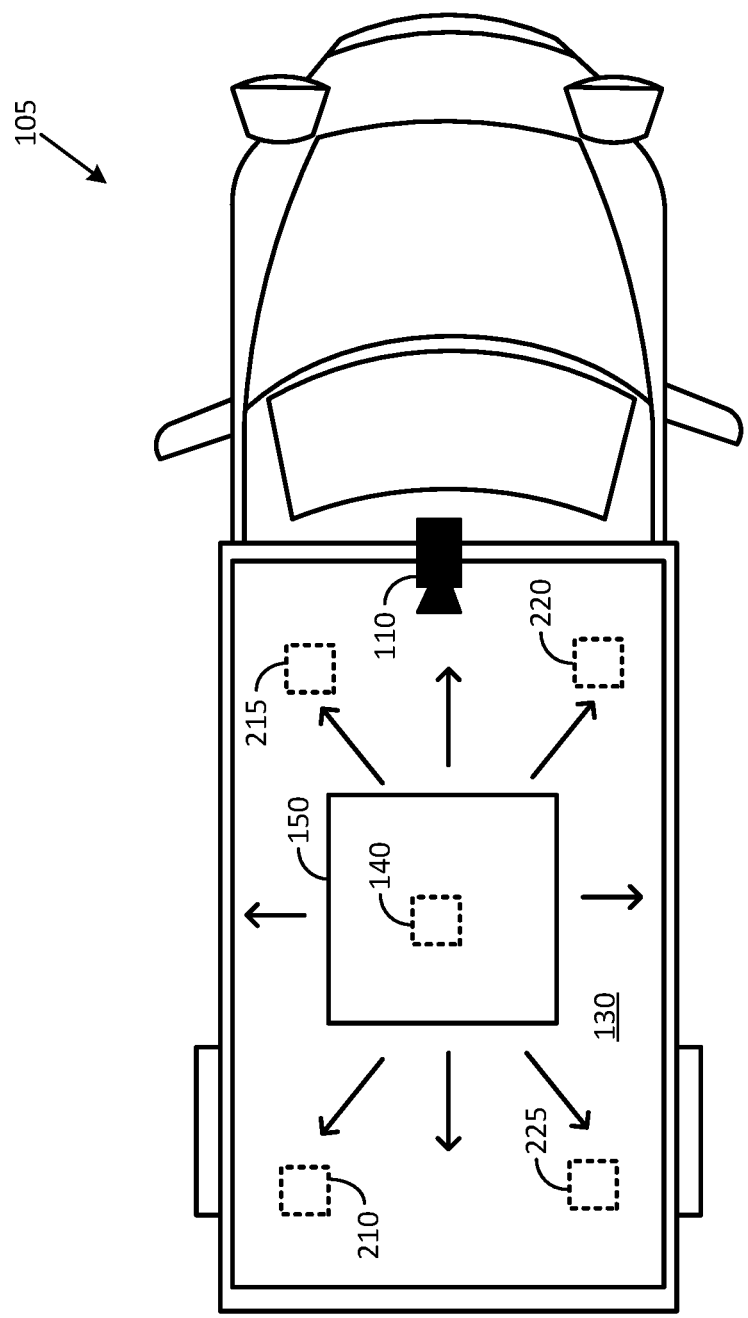
FIG. 2 shows an example implementation of a vehicle load balancing system that includes multiple weight sensors provided in a vehicle in accordance with an embodiment of the disclosure.

FIG. 2 shows an example implementation wherein multiple weight sensors are provided in the vehicle 105. The multiple weight sensors can be attached to the cargo bed 130 at various locations. In the illustrated example implementation, the weight sensor 140 is located at a central location on the cargo bed 130, a weight sensor 225 is located near the rear passenger-side corner of the cargo bed 130, weight sensor 220 is located near the front passenger-side corner of the cargo bed 130, a weight sensor 210 is located near the rear driver-side corner of the cargo bed 130, and a weight sensor 215 is located near the front driver-side corner of the cargo bed 130.

The weight sensor 140 is configured to provide to the vehicle load balancing system 125, a first weight measurement of the cargo item 150, which, in this example scenario, is placed directly above the weight sensor 140. Each of the weight sensor 210, weight sensor 215, weight sensor 225, and weight sensor 220 may also be configured to provide to the vehicle load balancing system 125, individual weight measurements of the cargo item 150. Each of these individual weight measurements will be less than the weight measurement provided by the weight sensor 140 because the cargo item 150 is located away from each of these other weight sensors.

In an example scenario, the cargo item 150 may shift from one spot to another on the cargo bed 130 as a result of motion of the vehicle 105 (acceleration, braking, turning, bumping, vibration, etc.). For example, the cargo item 150 may shift from the illustrated spot to another spot that is closer to the cabin of the vehicle 105. In this scenario, the first measurement provided by the weight sensor 140 to the vehicle load balancing system 125 will reduce and one or both weight measurements provided by the weight sensor 220 and/or the weight sensor 215 the vehicle load balancing system 125, will increase.

The vehicle load balancing system 125 may detect the change in weight measurements and confirm that a shift has taken place by evaluating one or more images provided by the camera 110. The vehicle load balancing system 125 may then provide an indication to the driver 115 to perform a driving maneuver that returns the cargo item 150 to its previous location above the weight sensor 140 in accordance with disclosure. In an example scenario, the indication is provided in the form of a text message and/or one or more images displayed via a graphical user interface (GUI) of the infotainment system 117 or via a personal device (not shown) carried by the driver 115. Additional details pertaining to these aspects are described below.

Figure 3A:
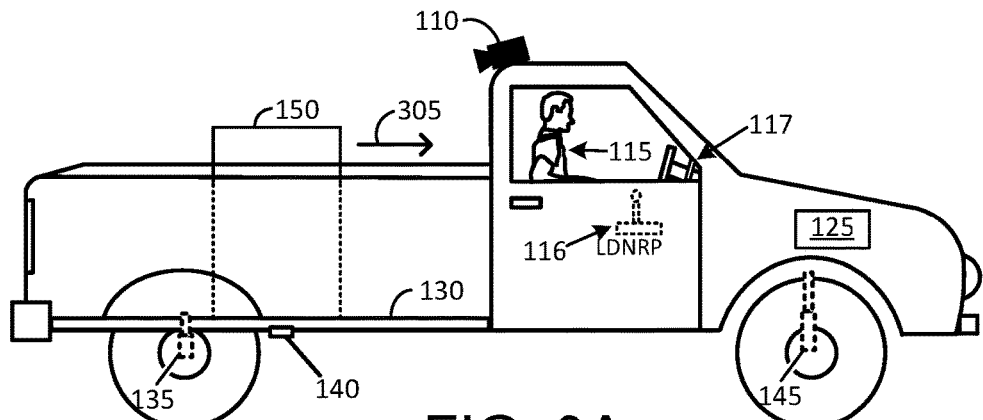
FIGS. 3A-C illustrate a first example scenario associated with a load balancing procedure that can be carried out in accordance with an embodiment of the disclosure.
Figure 3B:
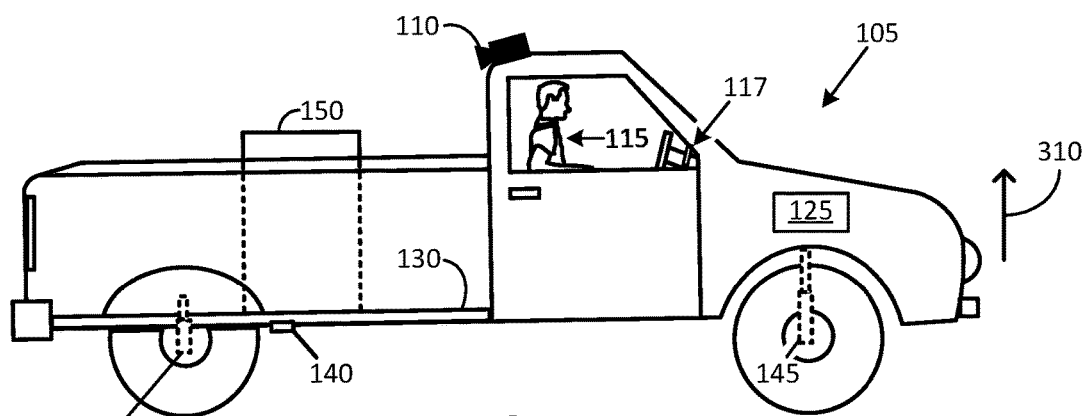
Figure 3C:
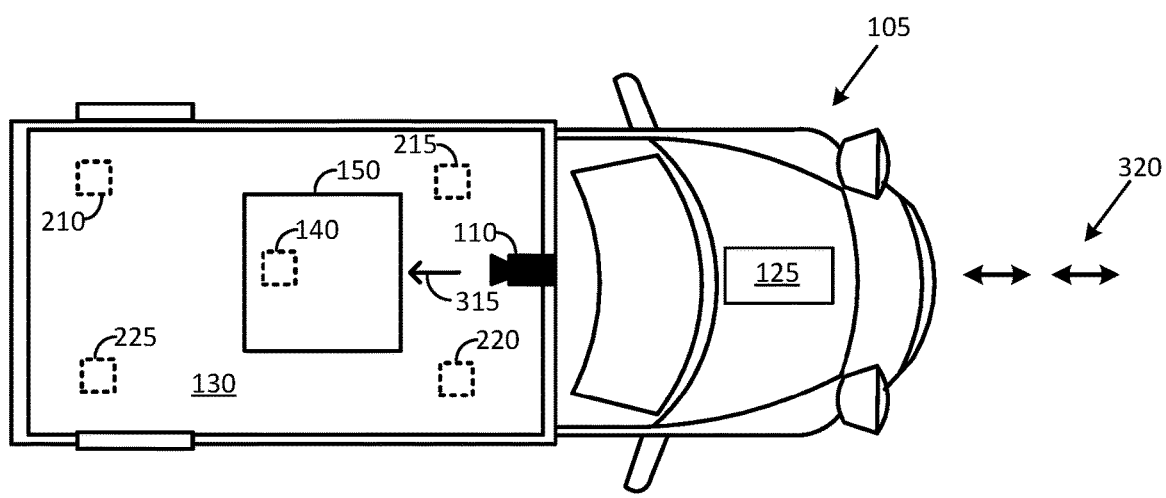

FIGS. 3A-3C illustrate a first example scenario associated with a load balancing procedure that can be carried out in accordance with an embodiment of the disclosure. In the example scenario illustrated in FIG. 3A, the cargo item 150 is located directly above weight sensor 140 at a first instant in time such as, for example, when the cargo item 150 is first loaded on to the vehicle 105. At this time, the cargo item 150 can be considered to be in a default/initial/original position and a first weight measurement may be conveyed by the weight sensor 140 to the vehicle load balancing system 125. The first weight measurement can be referred to as a preliminary weight measurement or a default stage weight measurement in some cases.

The driver 115 may then set the vehicle 105 in motion. In an example implementation, the processor 126 of the vehicle load balancing system 125 may detect that the vehicle 105 has been set in motion based on receiving a signal from a movement sensor provided in the drive selector 116 of the vehicle 105. The signal provides an indication that the drive selector 116 has been actuated by the driver 115 to transition the vehicle 105 from a park mode to a drive mode. The sensor can be arranged to detect a shifting of the drive selector 116 from a park position ("P") to one of a low gear drive position ("L"), a forward drive position ("D"), a neutral position ("N"), or a reverse drive position ("R").

In another example implementation, the processor 126 detects a transitioning of the vehicle 105 from a parked condition to a moving condition based on evaluating a signal received from the vehicle computer 120 and/or components such as, a speedometer of the vehicle 105 or a movement sensor arranged to detect a rotation of a wheel of the vehicle 105.

In another example implementation, the processor 126 detects a transitioning of the vehicle 105 from a parked condition to a moving condition based on evaluating one or more images provided by the camera 110. The one or more images may be provided, for example, in the form of a video-clip produced by the camera 110 in real time.

In an example scenario, the driver 115 drives the vehicle 105 down a road and approaches a traffic light at an intersection. At this time, the driver 115 may initially decide to speed through the intersection while the traffic light is in a yellow state but may then change his/her mind and jam on the brakes before reaching the intersection. The hard braking action may cause the cargo item 150 to shift forward (as indicated by the arrow 305).

In an example embodiment, the weight sensor 140 may detect a change in weight due to the shifting action of the cargo item 150 and convey to the vehicle load balancing system 125, a second weight measurement that can be different than the first weight measurement. In the illustrated scenario, the shift in position of the cargo item 150 results in the second weight measurement being lower than the first weight measurement. In another scenario, the second weight measurement can be higher than the first weight measurement because the cargo item 150 was initially placed in an offset position with respect to the weight sensor 140 (closer towards the rear end of the vehicle 105).

In another example embodiment, one or more sensors provided in the vehicle 105 such as, for example, a motion sensor (not shown) can detect the shifting action of the cargo item 150 and transmit a signal to the vehicle load balancing system 125 to inform the vehicle load balancing system 125 of the shift. The vehicle load balancing system 125 may respond to the signal by communicating with the weight sensor 140 to obtain the second weight measurement from the weight sensor 140.

The vehicle load balancing system 125 may detect the shifting of the cargo item 150 based on determining the difference between the first weight measurement and the second weight measurement and/or based on evaluating images captured by a camera such as, for example, the camera 110. Upon detecting the shift, the vehicle load balancing system 125 may initiate further actions that are described below with reference to FIGS. 3B and 3C.

In another example scenario, the vehicle 105 is stopped at an intermediate spot along a travel route. The intermediate spot at which the vehicle 105 is stopped can be, for example, a traffic light in a red state. When the traffic light turns green, the driver may place the vehicle 105 in motion and accelerate rapidly. The rapid acceleration may cause the cargo item 150 to shift backwards towards the tail end of the vehicle 105. The vehicle load balancing system 125 may detect the backwards shifting of the cargo item 150 based on, for example, determining the difference between the first weight measurement and the second weight measurement and/or based on evaluating one or more images captured by a camera. Upon detecting the shift, the vehicle load balancing system 125 may initiate further actions that are described below with reference to FIGS. 3B and 3C.

FIG. 3B illustrates a first example operation that may be performed as part of a load balancing procedure in accordance with an embodiment of the disclosure. In this example scenario, the cargo item 150 has moved forwards towards that cabin of the vehicle 105 due to any one or more of various factors such as, for example, a hard braking action carried out by the driver 115. The vehicle load balancing system 125 initiates a load balancing procedure by first placing the cargo bed 130 of the vehicle 105 in a tilted configuration. The slope of the tilt in this scenario is downwards towards the tail end of the vehicle 105. The angle of tilt of the cargo bed may be determined by the vehicle load balancing system 125 based on various factors such as, for example an extent of the forward shift of the cargo item 150 (illustrated in FIG. 3A), a physical size of the cargo item 150, and/or a length of the cargo bed 130.

In an example embodiment, the procedure to place the cargo bed 130 of the vehicle 105 in the tilted configuration is executed automatically by the vehicle load balancing system 125 without an intervention by the driver 115. The tilting operation may involve lifting the front end of the vehicle 105 (as indicated by arrow 310) by actuating the first shock absorber 145 on the front passenger-side of the vehicle 105 and the second shock absorber (not shown) on the front driver-side of the vehicle 105 to a height that is determined by the vehicle load balancing system 125 based on a desired slope. In some cases, in lieu of, or in addition to, actuating the first shock absorber 145 and the second shock absorber, the vehicle load balancing system 125 may actuate the third shock absorber 135 on the rear passenger-side and the fourth shock absorber (not shown) on the rear driver-side wheel of the vehicle 105 to lower the rear portion of the vehicle 105.

In another example embodiment, the vehicle load balancing system 125 may provide instructions to the driver 115 for actuating the shock absorbers in the manner described above that is carried out automatically by the vehicle load balancing system 125. In an example scenario, the instructions are displayed on a display screen of the infotainment system 117 and the driver 115 performs the instructions by using one or more actuation components in the cabin of the vehicle 105.

FIG. 3C illustrates a second example operation that may be performed as part of a load balancing procedure in accordance with an embodiment of the disclosure. The second example operation is performed after the cargo bed 130 has been placed in the tilted configuration described above. In an example implementation where the vehicle 105 is an autonomous vehicle, the vehicle load balancing system 125 may automatically cause the vehicle 105 to jerk sporadically while traveling forwards in what may be described as a jerky, sporadic mode of travel (as indicated by a set of arrows 320). The jerky, sporadic mode of travel may be executed in the form of one or more acceleration-braking sequences where each acceleration-braking sequence involves a rapid acceleration start, travel over a short distance for a period of time, followed by a hard braking operation.

For example, a first acceleration-braking sequence can involve the vehicle 105 being moved forward rapidly over 10 feet and stopped abruptly within 2 feet. The acceleration-braking sequence can be replicated multiple times in order to move the cargo item 150 backwards (as shown by arrow 315) to an original spot at which the cargo item 150 was located prior to being shifted (i.e., directly above the weight sensor 140 in this example scenario). In one case, the sequence of operations is carried out in a periodic, repetitive manner. In another case, the sequence of operations is carried out in a random or quasi-random manner (such as, for example, move forward for 10 secs, stop, move forward for 15 secs, stop, move forward for 5 secs, and so on).

In another example embodiment, the vehicle load balancing system 125 may provide instructions to the driver 115 for executing the jerky, sporadic mode of travel. In an example scenario, the instructions are displayed on a display screen of the infotainment system 117 and the driver 115 performs the driving and braking operations in accordance with the instructions.

The description provided above with reference to the operation of the vehicle load balancing system 125 when the cargo item 150 shifts forward on the cargo bed 130 (such as, for example, due to a hard braking action performed by the driver 115 at a traffic light) is equally applicable to a scenario where the cargo item 150 shifts backwards on the cargo bed 130 such as, due to a rapid acceleration of the vehicle 105. In this scenario where the cargo item 150 has shifted backwards, the first example operation that may be performed as part of a load balancing procedure (and described above with reference to FIG. 3B) involves placing the cargo bed 130 a tilted configuration such that the rear end of the vehicle 105 is raised with respect to the front end. This may be carried out by actuating the third shock absorber 135 on the rear passenger-side and the fourth shock absorber (not shown) on the rear driver-side wheel of the vehicle 105 to raise the rear portion of the vehicle 105 and/or by actuating the first shock absorber 145 on the front passenger-side of the vehicle 105 and the second shock absorber (not shown) on the front driver-side of the vehicle 105 to lower the front end of the vehicle 105.

After placing the vehicle 105 in this tilted configuration, the second example operation described above with reference to FIG. 3C is carried out. In some cases, the vehicle 105 may be driven in reverse in the jerky, sporadic mode of travel for moving the cargo item 150 back to the original spot at which the cargo item 150 was located prior to being shifted (i.e., directly above the weight sensor 140 in this example scenario).

FIGS. 4A and 4B illustrate a second example scenario associated with a load balancing procedure that can be carried out in accordance with an embodiment of the disclosure. In this example scenario, the cargo item 150 has shifted sideways on the cargo bed 130 of the vehicle 105 (indicated by an arrow 405). The sideways shift in this case is towards the passenger side of the vehicle 105, but in another case the shift can be towards the driver side. The load balancing procedure is equally applicable to either direction of shift. The sideways shift may have occurred due to various factors such as, for example, because the vehicle 105 traveled over a steep embankment or due to the wheels of vehicle 105 on the driver side moving over an object lying on the road. The vehicle load balancing system 125 may detect the shifting of the cargo item 150 based on detecting a change in one or more weight measurements and/or based on evaluating images in the manner described above.

The vehicle load balancing system 125 may then initiate a load balancing procedure by first placing the cargo bed 130 of the vehicle 105 in a sideways tilted configuration as illustrated in FIG. 4A. An angle of tilt of the cargo bed in this scenario is downwards towards the passenger side of the vehicle 105. The extent of the slope may be determined by the vehicle load balancing system 125 based on various factors such as, for example an extent of the sideways shift of the cargo item 150, a physical size of the cargo item 150, and a width of the cargo bed 130.

In an example embodiment, placing the cargo bed 130 of the vehicle 105 in the tilted configuration is carried out automatically by the vehicle load balancing system 125. The operation may involve raising the driver side of the vehicle 105 (as indicated by arrow 410) by actuating the second shock absorber (not shown) on the front driver-side of the vehicle 105 and the fourth shock absorber 415 on the rear driver-side of the vehicle 105. In some cases, in lieu of, or in addition to, actuating the second shock absorber and the fourth shock absorber 415, the vehicle load balancing system 125 may actuate the first shock absorber 145 on the front passenger-side of the vehicle 105 and the third shock absorber 135 on the rear passenger-side of the vehicle 105 to lower the passenger side of the vehicle 105.

In another example embodiment, the vehicle load balancing system 125 may provide instructions to the driver 115 for actuating the shock absorbers in the manner described above that is carried out automatically by the vehicle load balancing system 125 without intervention by the driver 115. In an example scenario, the instructions are displayed on a display screen of the infotainment system 117 and the driver 115 performs the instructions by using one or more actuation components in the cabin of the vehicle 105.

FIG. 4B illustrates an example operation that may be performed as part of a load balancing procedure after the vehicle 105 has been placed in the sideways titled configuration shown in FIG. 4A. In an example implementation where the vehicle 105 is an autonomous vehicle, the vehicle load balancing system 125 may cooperate with the zero-radius turn system 155 to automatically cause the vehicle 105 to crab-walk sideways. The crab-walk may be executed in a jerky sporadic mode of travel (as indicated by a set of arrows 425). The jerky, sporadic mode of travel may be executed in the form of a sequence of operations where each operation involves a sharp turning and movement of a front portion of the vehicle 105 sideways towards the right, for example, followed by a sharp turning and movement of a rear portion of the vehicle 105 sideways. The sharp turning and movement of the front portion of the vehicle 105 may be carried out by orienting the front wheels of the vehicle 105 in a direction that is indicated by an arrow 430. The sharp turning and movement of the rear portion of the vehicle 105 may be carried out by orienting the rear wheels of the vehicle 105 in a direction that is indicated by an arrow 420.

Figure 5A:
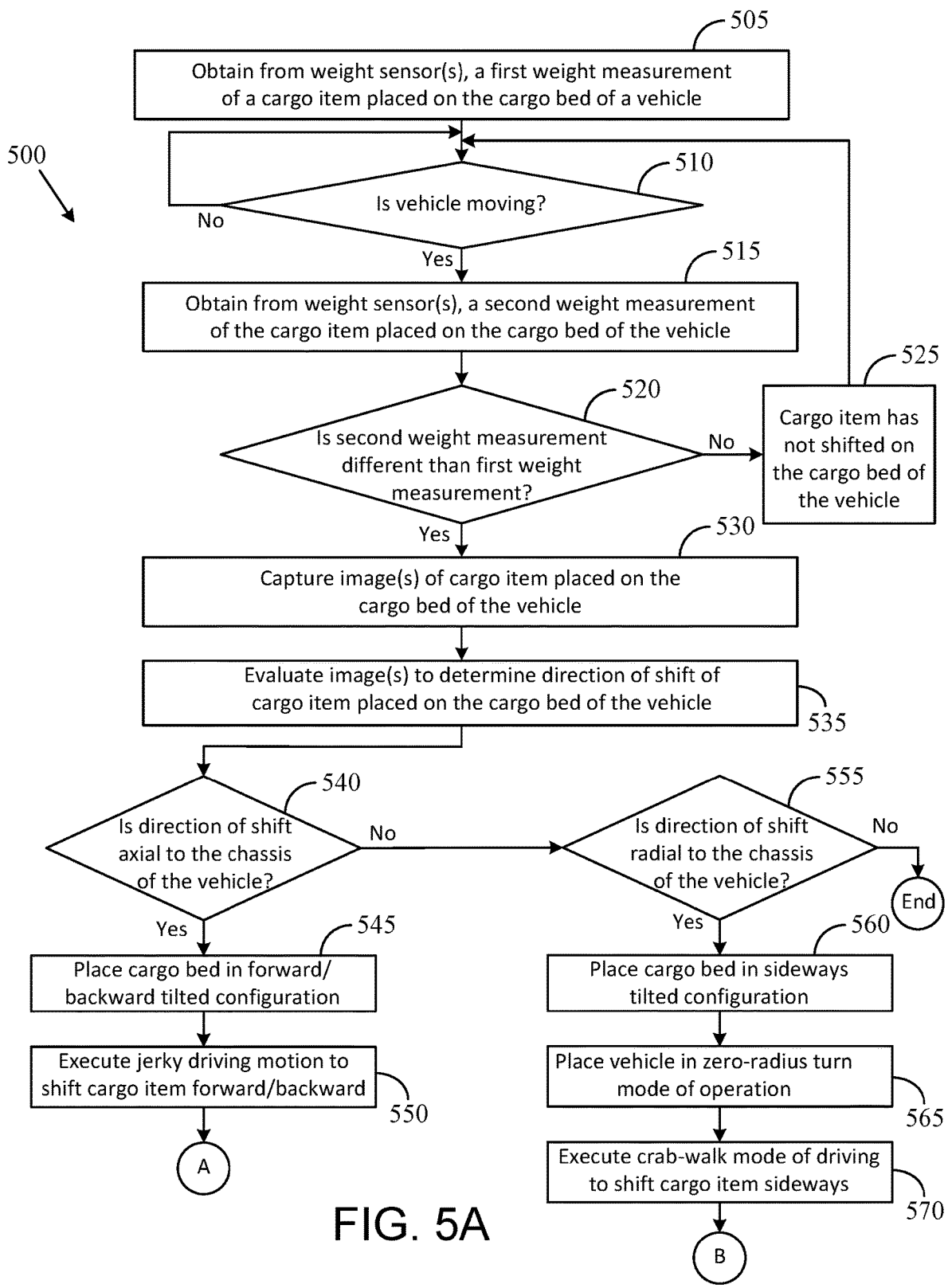
FIGS. 5A and 5B show a flowchart of a method to perform a load balancing procedure in accordance with an embodiment of the disclosure.
Figure 5B:
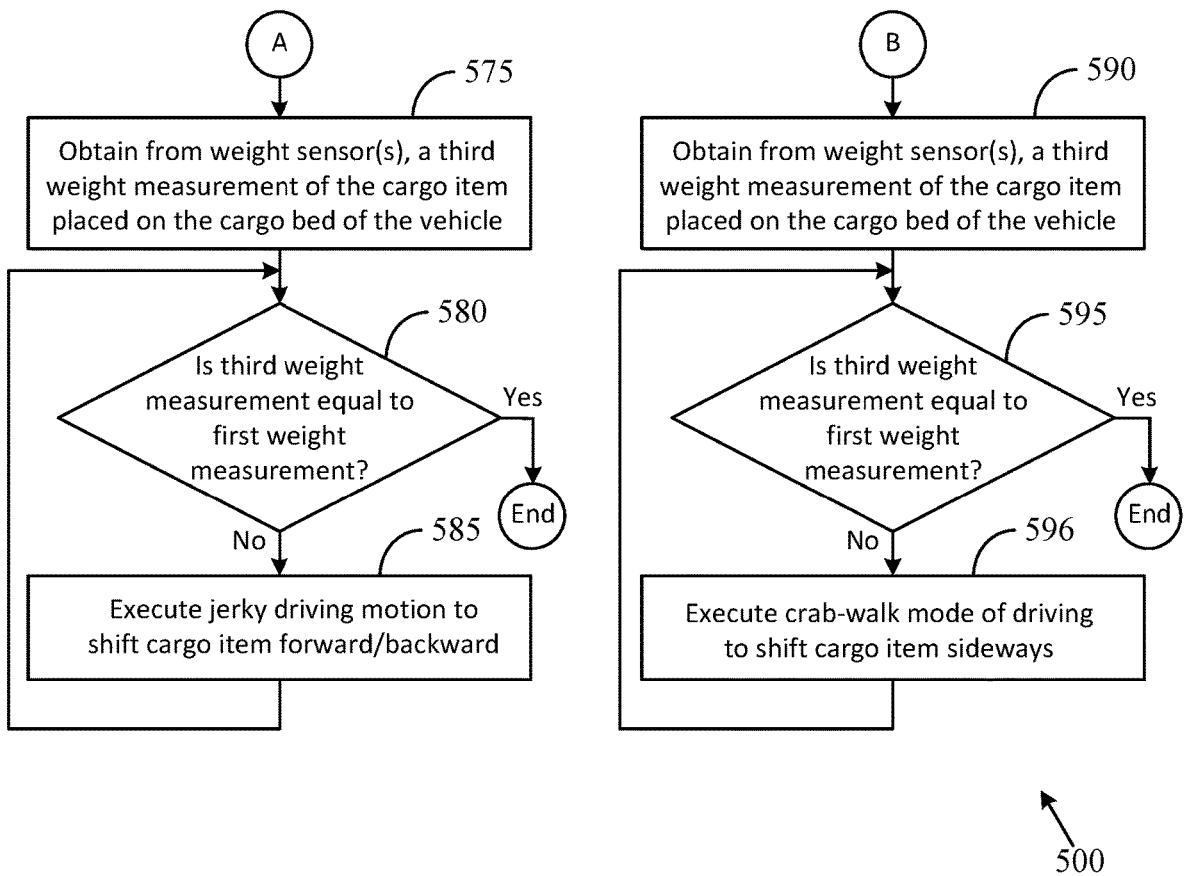

FIGS. 5A and 5B show a flowchart 500 of a method to perform a load balancing procedure in accordance with an embodiment of the disclosure. The flowchart 500 illustrates a sequence of operations that can be implemented in hardware, software, or a combination thereof. In the context of software, the operations represent computer-executable instructions stored on one or more non-transitory computer-readable media, such as, for example, the memory 127 of the vehicle load balancing system 125, that, when executed by one or more processors, such as the processor 126 of the vehicle load balancing system 125, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Various operations described in the flowchart 500 may be executed by the vehicle load balancing system 125, the vehicle computer 120, and/or manually by the driver 115 of the vehicle 105.

At block 505, a first weight measurement is obtained from one or more weight sensors that are arranged to provide weight measurements of a cargo item placed on a cargo bed of a vehicle.

At block 510, a determination is made whether the vehicle is moving. The determination may be made in any of various ways such as, for example, based on receiving a signal from a movement sensor provided in a drive selector of the vehicle, based on evaluating images received from a camera mounted upon the vehicle, based on evaluating a signal received from a vehicle computer of the vehicle, and/or signals received from components such as a movement detector or a speedometer.

If the vehicle is not moving, the action indicated in block 510 is repeated until the vehicle begins to move and is detected as moving.

At block 515 a second weight measurement of the cargo item is obtained from one or more weight sensors.

At block 520 a determination is made whether the second weight measurement is different than the first weight measurement. The second weight measurement can be different than the first weight measurement if an amount of pressure applied upon a weight sensor is either reduced or increased because the cargo item has shifted from one spot to another spot on the cargo bed of the vehicle 105.

If the second weight measurement is the same as the first weight measurement, at block 525, a determination is made to confirm that the cargo item has not shifted on the cargo bed of the vehicle. The actions indicated in block 510 and subsequent blocks are then carried out.

In an example scenario, at block 520, the determination indicates that the second weight measurement is different than the first weight measurement due to a shifting of the cargo item upon the cargo bed. The shifting may be caused by one or more of various factors such as, for example, a hard braking action, a rapid acceleration of the vehicle, or a tilting of the vehicle due to travel over a steep road embankment or an object lying on a road.

If the second weight measurement is different than the first weight measurement, at block 530, one or more images of the cargo item is captured.

At block 535, the one or more images of the cargo item are evaluated to identify a direction of shift of the cargo item upon the cargo bed. In an example implementation, the second image described above can be compared to the first image for determining a direction of shift of the cargo item upon the cargo bed (forwards towards the cabin, backwards towards the tail end of the vehicle, and/or sideways).

At block 540, a determination is made whether the direction of shift is axial to the chassis of the vehicle. For example, the cargo item may have shifted either forwards or backwards along a longitudinal axis of the chassis of the vehicle.

If the direction of shift is axial to the chassis of the vehicle, at block 545, the cargo bed of the vehicle is placed in a tilted configuration. For example, if the cargo item has shifted forwards towards the cabin of the vehicle, placing the vehicle in the tilted configuration can involve raising a front portion of the vehicle and/or lowering a rear portion of the vehicle. If the cargo item has shifted backwards towards the tail end of the vehicle, placing the vehicle in the tilted configuration can involve raising a rear portion of the vehicle and/or lowering a front portion of the vehicle.

At block 550, the vehicle is subjected to a jerky, sporadic mode of travel for moving the cargo item 150 back to the original spot at which the cargo item 150 was located prior to being shifted as a result of motion of the vehicle.

At block 575, a third weight measurement of the cargo item is obtained from one or more weight sensors.

At block 580, a determination is made whether the third weight measurement is equal to the first weight measurement. The third weight measurement being equal to the first weight measurement is an indication that the cargo item has been moved back to its initial position. If so, the load balancing procedure is terminated. If the third weight measurement is not equal to the first weight measurement, at block 585, the jerky, sporadic mode of travel of the vehicle is carried out. In one case, the amount of shifting as a result of the jerky sporadic mode of travel performed at block 550 may be inadequate. Consequently, the jerky, sporadic mode of travel of the vehicle at block 580 may either be repeated more often or may be performed using a different driving pattern such as, for example, harder braking and less intense acceleration or vice-versa. In another case, the amount of shifting as a result of the jerky sporadic mode of travel performed at block 550 may be excessive causing the cargo item to overshoot the original location at which the cargo item was placed. In this case, the jerky, sporadic mode of travel of the vehicle at block 580 may be performed using a different driving pattern such as, for example, harder braking and less intense acceleration or vice-versa.

The actions indicated at block 585, block 575, and block 580 may be performed repeatedly in the form of an iterative procedure, until, at block 580, the determination indicates that the third weight measurement is substantially the same as the first weight measurement. In an example implementation, the substantial equivalency between the third weight and first weight may be defined as a percentage such as for example, the third weight measurement being equal to the first weight measurement plus or minus a tolerance value (+/−5%, for example).

Turning back to block 540, if the direction of shift of the cargo item is not axial to the chassis of the vehicle, at block 555, a determination is made whether the direction of shift is radial to the chassis of the vehicle. For example, the cargo item may have shifted either left or right in a direction that is perpendicular to the longitudinal axis of the chassis of the vehicle.

If the direction of shift of the cargo item is not axial to the chassis of the vehicle, the load balancing procedure is terminated.

If the direction of shift of the cargo item is axial to the chassis of the vehicle, at block 560, the cargo bed of the vehicle is placed in a tilted configuration. For example, if the cargo item has shifted towards the right side of the vehicle, placing the vehicle in the tilted configuration can involve raising the right side of the vehicle and/or lowering the left side of the vehicle. If the cargo item has shifted towards the left side of the vehicle, placing the vehicle in the tilted configuration can involve raising the left side of the vehicle and/or lowering the right side of the vehicle.

At block 565, the vehicle is placed in a zero-radius turn mode of operation.

At block 570, the vehicle is subjected to a crab-walk mode of driving so as to shift the cargo item sideways back to its original position on the cargo bed.

The actions indicated subsequentially at block 590, block 595, and block 596 replicate the actions described above with reference to block 575, block 580, and block 585 respectively with one exception. Unlike at block 585 where the vehicle was subjected to jerky sporadic motion backwards/forwards mode of travel, at block 596, the vehicle is subjected to a crab-walk mode of travel sideways.

Many variations of the operations described above with reference to the flowchart 500 can be executed in accordance with the disclosure. In an example variant, the actions indicated at block 505, block 510, block 515, block 520, and block 525 may be omitted and the load balancing procedure can be started at block 530. In an example implementation of this variant, a first image of the cargo item can be captured when the cargo item is in a default state such as, for example, when the cargo item is first loaded on to the cargo bed of the vehicle or when the vehicle is stationary. A second image can be captured at a later instant in time. In one case, the second image of the cargo item can be captured after a determination is made that the vehicle is moving or is in a stopped condition after moving over a period of time and/or over a distance. In another case, the second image is captured in response to evaluating a signal that is generated by a detecting device (such as for example, a motion sensor) that detects a positional shift of the cargo item on the cargo bed as a result of the motion of the vehicle. The second image can be compared with the first image to detect events such as an occurrence of a shift of the cargo item as a result of movement of the vehicle and a direction of shift of the cargo item.

Furthermore, the actions indicated at block 575 through block 585 and block 590 through block 596 by use of a third weight measurement can be replaced with actions involving the use of a third image in place of the third weight and comparing the third image to the first image to determine if the cargo item has moved back to its original spot on the cargo bed.

Figure 6:
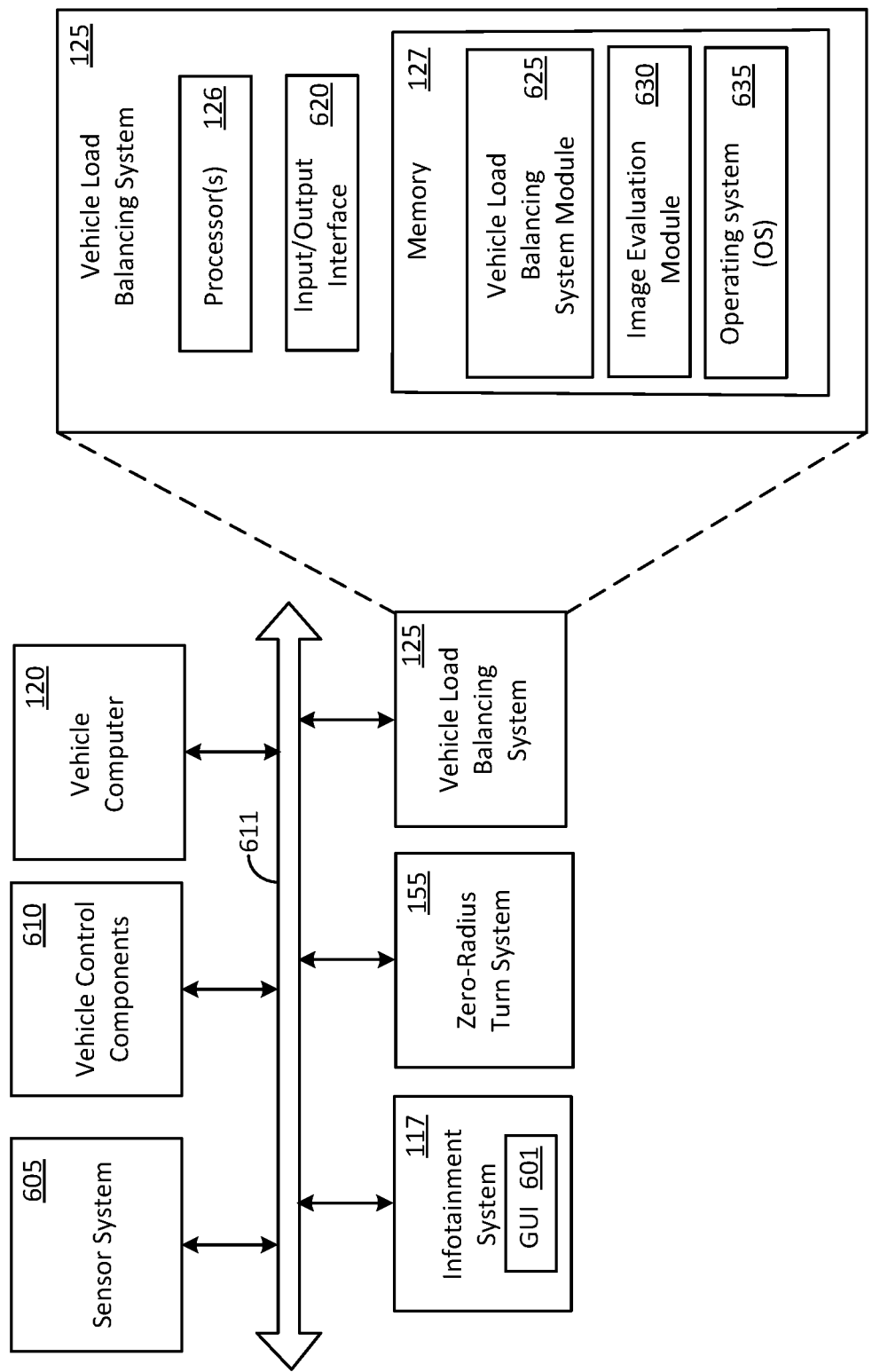
FIG. 6 shows some example components that can be included in a vehicle in accordance with an embodiment of the disclosure.

FIG. 6 shows some example components that can be included in the vehicle 105 in accordance with an embodiment of the disclosure. The example components can include a detector system 605, vehicle control components 610, the vehicle computer 120, the infotainment system 117, the zero-radius turn system 155, and the vehicle load balancing system 125. The various components are communicatively coupled to each other via one or more buses such as an example bus 611. The bus 611 may be implemented using various wired and/or wireless technologies. For example, the bus 611 can be a vehicle bus that uses a controller area network (CAN) bus protocol, a Media Oriented Systems Transport (MOST) bus protocol, and/or a CAN flexible data (CAN-FD) bus protocol. Some or all portions of the bus 611 may also be implemented using wireless technologies such as Bluetooth®, Bluetooth®, Ultra-Wideband, Wi-Fi, Zigbee®, or near-field-communications (NFC).

The detector system 605 can include various types of detectors/sensors such as, for example, the camera 110, the weight sensor 140, the weight sensor 215, the weight sensor 220, the weight sensor 210, and the weight sensor 225 that are described above. The signals conveyed by the various detectors/sensors of the detector system 605 to the vehicle load balancing system 125 can vary in accordance with the type of detector. For example, the camera 110 can provide an image of the cargo item 150 in one of various formats (jpeg, mpeg, etc.), and the weight sensor 140 can provide a signal in terms of an amount of pressure applied upon the weight sensor 140 (pounds per square inch) or a weight (kilograms, pounds, etc.).

The vehicle control components 610 can include various components and systems associated with driving-related functions of the vehicle 105 as well as with functions that are associated with the vehicle load balancing system 125. Some example driving-related functions can include the operation of various vehicle components (engine, brakes, accelerator, fuel injection, etc.), and actions such as collision avoidance, automatic braking, and cruise control. The vehicle control components 610 may be controlled, activated, and/or operated by the vehicle computer 120. In some cases, some of the vehicle control components 610 may be controlled, activated, and/or operated by the vehicle load balancing system 125. For example, the vehicle load balancing system 125 may utilize some of the vehicle control components 610 to detect the cargo item 150 and to control an operation of one or more shock absorbers of the vehicle 105 (raising, lowering, etc.).

The infotainment system 117 can include a display system having a GUI 601 for carrying out various operations. The GUI may be used by the driver 115 of the vehicle 105 to interact with the vehicle load balancing system 125, such as, for example, to receive instructions on how to execute a driving maneuver for moving the cargo item 150 back to an original spot from another spot to which the cargo item 150 may have shifted due to motion of the vehicle 105.

The zero-radius turn system 155 can include the various components that enable the driver 115 and/or the vehicle computer to execute a crab-walk mode of operation where the vehicle 105 moves in a sideways direction.

The vehicle load balancing system 125 can be implemented in various ways. In one example implementation, the vehicle load balancing system 125 can be an independent device (enclosed in an enclosure, for example). In another example implementation, some or all components of the vehicle load balancing system 125 can be housed, merged, or can share functionality, with the vehicle computer 120. For example, an integrated unit that combines the functionality of the vehicle load balancing system 125 with that of the vehicle computer 120 can be operated by a single processor and a single memory device. In the illustrated example configuration, the vehicle load balancing system 125 includes the processor 126, an input/output interface 620, and a memory 127.

The input/output interface 620 is configured to provide communications between the vehicle load balancing system 125 and other components coupled to the bus 611 such as, for example, the detectors/sensors of the detector system 605.

The memory 127, which is one example of a non-transitory computer-readable medium, may be used to store an operating system (OS) 635, an image evaluation module 630, and various code modules such as, for example, a vehicle load balancing system module 625. The code modules are provided in the form of computer-executable instructions that can be executed by the processor 126 for performing various operations in accordance with the disclosure.

The vehicle load balancing system module 625 may be executed by the processor 126 for performing various operations in accordance with the disclosure. Some example operations are described above. Execution of some of these operations can involve the vehicle load balancing system module 625 utilizing the image evaluation module 630 for evaluating images captured by the camera 110.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a processor, from a first weight sensor, a first weight measurement of a cargo item placed at a first spot on a cargo bed of a vehicle;
   detecting, by the processor, that the vehicle is in motion;
   receiving, by the processor, from the first weight sensor, a second weight measurement after detecting that the vehicle is in motion;
   determining, by the processor, based on detecting a difference between the first weight measurement and the second weight measurement that the cargo item has shifted from the first spot to a second spot on the cargo bed due to motion of the vehicle;
   receiving, by the processor, a first image of the cargo item located at the first spot on the cargo bed of the vehicle;
   receiving, by the processor, a second image of the cargo item located at the second spot on the cargo bed of the vehicle;
   identifying, by the processor, based on evaluating the first image and the second image, a direction of shift of the cargo item on the cargo bed;
   placing, by the processor, the cargo bed of the vehicle in a tilted configuration that is determined at least in part on the direction of shift of the cargo item on the cargo bed; and configuring, by the processor, the vehicle to jerk sporadically while traveling in a first direction that is selected to shift the cargo item back from the second spot to the first spot on the cargo bed.

2. The method of claim 1, further comprising:
receiving, by the processor, from a second weight sensor, concurrently with the first weight measurement, a third weight measurement;
receiving, by the processor, from the second weight sensor, concurrently with the second weight measurement, a fourth weight measurement; and
identifying, by the processor, based on evaluating the first weight measurement, the second weight measurement, the third weight measurement, and the fourth weight measurement, a direction of shift of the cargo item on the cargo bed.

3. The method of claim 2, further comprising:
placing, by the processor, the cargo bed of the vehicle in a tilted configuration that is determined at least in part on the direction of shift of the cargo item on the cargo bed; and
configuring, by the processor, the vehicle to jerk sporadically while traveling in a first direction that is selected to shift the cargo item back from the second spot to the first spot on the cargo bed.

4. The method of claim 3, wherein the first direction of travel is opposite to the direction of shift of the cargo item from the first spot to the second spot on the cargo bed.

5. The method of claim 4, wherein the first direction of travel is a sideways movement of the vehicle that is executed by operating a zero-radius turn system of the vehicle.

6. A method comprising:
receiving, by a processor, a first image of a cargo item located at a first spot on a cargo bed of a vehicle;
detecting, by the processor, that the vehicle is in motion;
receiving, by the processor, a second image of the cargo item after detecting that the vehicle is in motion;
determining, by the processor, based on evaluating the first image and the second image that the cargo item has shifted from the first spot to a second spot on the cargo bed due to motion of the vehicle;
determining, by the processor, based on evaluating the first image and the second image, a direction of shift of the cargo item on the cargo bed;
placing, by the processor, the cargo bed of the vehicle in a tilted configuration that is determined at least in part on the direction of shift of the cargo item on the cargo bed; and
configuring, by the processor, the vehicle to jerk sporadically while traveling in a first direction that is selected to shift the cargo item back from the second spot to the first spot on the cargo bed.

7. The method of claim 6, wherein the first direction of travel is opposite to the direction of shift of the cargo item from the first spot to the second spot on the cargo bed and wherein placing the cargo bed in the tilted configuration comprises placing the cargo bed at an angle that provides a downwards slope from the second spot to the first spot.

8. The method of claim 7, wherein the first direction of travel is a sideways movement of the vehicle that is executed by operating a zero-radius turn system of the vehicle.

9. The method of claim 6, wherein placing the cargo bed in the tilted configuration comprises actuating at least a first component of a cargo bed tilting system supporting the cargo bed and wherein configuring the vehicle to jerk sporadically while traveling in the first direction comprises executing a series of acceleration-braking sequences upon the vehicle.

10. The method of claim 9, wherein executing the series of acceleration-braking sequences is an iterative procedure comprising:
determining, by the processor, after execution of a first acceleration-braking sequence that the cargo item is not located at the second spot on the cargo bed; and
executing, by the processor, a second acceleration-braking sequence to move the cargo item towards the second spot on the cargo bed.

11. The method of claim 10, wherein determining that the cargo item is not located at the second spot on the cargo bed comprises evaluating a third image of the cargo item captured after the first acceleration-braking sequence.

12. The method of claim 6, further comprising:
receiving, by the processor, from a first weight sensor, a first weight measurement of the cargo item located at the first spot on the cargo bed of the vehicle;
receiving, by the processor, from the first weight sensor, a second weight measurement of the cargo item after evaluating the first image and the second image and determining that the cargo item has shifted from the first spot to the second spot on the cargo bed; and
confirming, by the processor, based on detecting a difference between the first weight measurement and the second weight measurement that the cargo item has shifted from the first spot to the second spot on the cargo bed due to the motion of the vehicle.

13. A vehicle comprising:
a first weight sensor;
a camera;
a cargo bed tilting system;
a movement sensor; and
a vehicle load balancing system comprising:
a memory that stores computer-executable instructions; and
a processor configured to access the memory and execute the computer-executable instructions to perform operations comprising:
receiving, from the first weight sensor, a first weight measurement of a cargo item placed at a first spot on a cargo bed of the vehicle;
detecting, based on a signal received from the movement sensor, that the vehicle is in motion;
receiving, from the first weight sensor, a second weight measurement of the cargo item after detecting that the vehicle is in motion;
determining, based on detecting a difference between the first weight measurement and the second weight measurement that the cargo item has shifted from the first spot to a second spot on the cargo bed due to motion of the vehicle;
receiving, from the camera, a first image of the cargo item located at the first spot on the cargo bed of the vehicle;
receiving, from the camera, a second image of the cargo item located at the second spot on the cargo bed of the vehicle;
identifying, based on evaluating the first image and the second image, a direction of shift of the cargo item on the cargo bed;
determining a tilted configuration of the cargo bed based on the direction of shift of the cargo item on the cargo bed; and actuating at least a first component of the cargo bed tilting system to place the cargo bed of the vehicle in the tilted configuration; and configuring the vehicle to jerk sporadically while traveling in a first direction that is selected for shifting the cargo item back from the second spot to the first spot on the cargo bed.

14. The vehicle of claim 13, further comprising a zero-radius turn system, wherein the first direction of travel is a sideways movement of the vehicle, and wherein the processor is configured to access the memory and execute the computer-executable instructions to perform further operations comprising:

operating the zero-radius turn system to execute a sideways movement of the vehicle to shift the cargo item back from the second spot to the first spot on the cargo bed.

15. The vehicle of claim 13, further comprising a second weight sensor, and wherein the processor is configured to access the memory and execute the computer-executable instructions to perform further operations comprising:

receiving, from the second weight sensor, a third weight measurement of the cargo item located at the first spot on the cargo bed of the vehicle;

receiving, from the second weight sensor, a fourth weight measurement of the cargo item located at the second spot on the cargo bed of the vehicle;

identifying, based on detecting a difference between the third weight measurement and the fourth weight measurement, a first direction of shift of the cargo item on the cargo bed;

determining a tilted configuration of the cargo bed based on the first direction of shift of the cargo item on the cargo bed;

actuating at least a first component of a cargo bed tilting system of the vehicle to place the cargo bed of the vehicle in the tilted configuration; and configuring the vehicle to jerk sporadically while traveling in a second direction that is selected for shifting the cargo item back from the second spot to the first spot on the cargo bed.

16. The vehicle of claim 15, wherein the first weight sensor is a first pressure transducer and the second weight sensor is a second pressure transducer.

* * * * *